June 8, 1948. A. F. STEIN 2,442,866
FISHING LURE
Filed Feb. 1, 1946
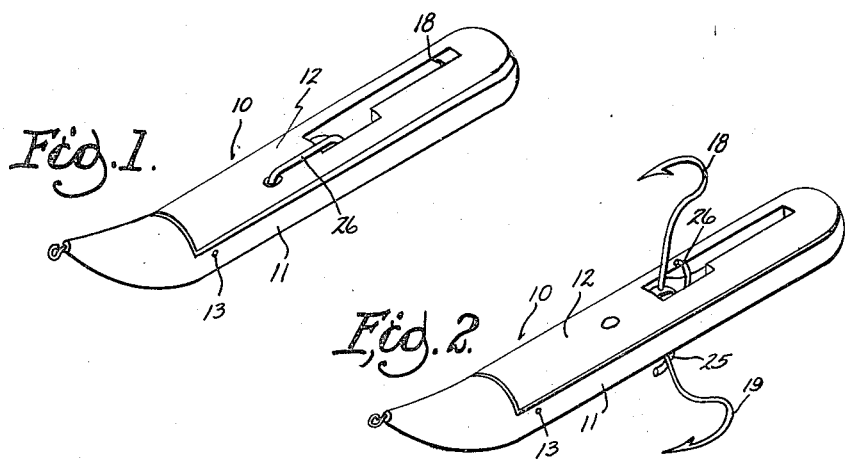
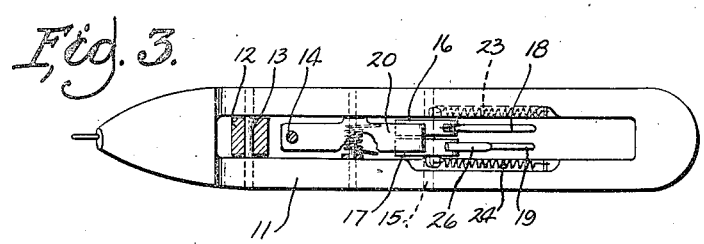
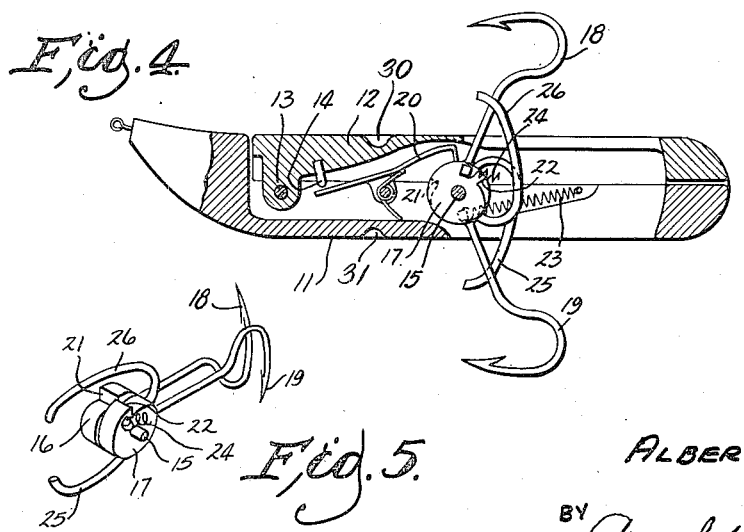
INVENTOR.
ALBERT F. STEIN
BY Gerald P. Welch
ATTORNEY.

Patented June 8, 1948

2,442,866

UNITED STATES PATENT OFFICE 2,442,866

FISHING LURE

Albert F. Stein, Milwaukee, Wis.

Application February 1, 1946, Serial No. 644,963

2 Claims. (Cl. 43—37)

This invention relates to improvements in fishing lures, and more particularly to a novel lure having a pair of spring pressed hooks.

An object of the invention is to provide a device of the type which will contain a pair of hooks folded therein and have the conventional appearance of a fishing lure and which when taken by a fish will allow the hooks to spring outwardly of the lure body.

Another object of the invention is to provide spring pressed hooks in a device of the type so disposed that they will catch into the upper and lower parts of the mouth of the fish for secure retention of the latter.

Other and further objects of the invention will appear as the description proceeds, reference being had to the accompanying drawing, in which:

Fig. 1 is a view in perspective of a fishing lure embodying my invention.

Fig. 2 is a similar view of the lure showing the hooks in projected position.

Fig. 3 is a plan view of the lure partly in elevation and partly in section.

Fig. 4 is a vertical sectional view of the lure.

Fig. 5 is a view in perspective of the hook and cam construction.

Referring more particularly to the drawings, the numeral 10 refers to the device generally, comprising a slotted body portion 11, and a slotted cover member 12, pivoted for limited movement at 13, and having the depressor pin 14.

An axle 15 journals the circular cams 16 and 17 in which are fixed the fish-hooks 18 and 19, so disposed that on proper movement of the cams 16 and 17 said fish-hooks will protrude at about 180 degrees through the slots in body 11 and cover 12. Each cam 16 and 17 has a single tooth engageable by the pivoted, spring-pressed detent 20. The teeth 21 and 22 are opposed, and the cams 16 and 17 are provided with coil springs 23 and 24 connecting them with the body portion 11 in such a manner that the tension of the springs 23 and 24 will urge the cams in opposite directions. Levers 25 and 26 are provided for manually turning the cams 16 and 17 against the tension of the springs 23 and 24 to withdraw hooks 18 and 19 into the slotted members 11 and 12 in parallel alignment therein, and at this position of the hooks and cams, the pivoted detent 27 engages the cam teeth 21 and 22. When the hooks 18 and 19 are positioned within the body of the lure, the levers 25 and 26 are accommodated by the indentation 30 in member 12 at the top thereof, and the indentation 31 in member 11.

The position of these members is thus held until a fish seizes the lure 10, compressing the cover member 12 against the body portion 11, whereupon the depressor pin 14 impinges against the detent lever 27 withdrawing said detent from the cam teeth 21 and 22, causing the hooks 18 and 19 under the tension of coil springs 23 and 24 to fly out to a position approximately rectangularly to the lure 10. If the fish has seized the lure while the former is vertically poised, the hooks will engage in the upper and lower jaws of the fish.

It will be understood that the device is capable of many modifications in structure and design, without departing from the spirit of the invention, within the scope of the appended claims.

Having thus described my invention, what I claim and desire to secure by Letters Patent of the United States is:

1. A device of the character described comprising a body portion, an axle fixed in said body portion, a pair of cams freely mounted on said axle, a hook on each cam member, a coil spring fastened to each cam member on opposed sides thereof respectively, a detent for releasably securing said cams against the tension of said coil springs whereby said hooks are held within said body, and means on said body adapted to be compressed for the release of said detent.

2. A device of the character described including a longitudinally slotted body, a cover member pivoted thereto for limited movement and having a longitudinal slot therein, a pair of circular cams mounted rotatably in said body, opposed fishhooks fixed one in each cam, spring means on said cams, a detent for releasably securing both cams with the hooks within the body, and means for releasing said detent by inward movement of said cover member.

ALBERT F. STEIN.

REFERENCES CITED

The following references are of record in the file of this patent:

UNITED STATES PATENTS

| Number | Name | Date |
|---|---|---|
| 1,012,528 | Doose | Dec. 19, 1911 |
| 1,507,344 | Doering | Sept. 2, 1924 |
| 2,200,670 | Hargrett | May 14, 1940 |